(12) United States Patent  
Bunney

(10) Patent No.: US 6,487,584 B1  
(45) Date of Patent: Nov. 26, 2002

(54) MULTIPLE PERSONALITY INTERNET ACCOUNT

(75) Inventor: William Bunney, Köln (DE)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/270,600

(22) Filed: Mar. 17, 1999

(30) Foreign Application Priority Data

Mar. 18, 1998 (EP) .............................. 98104958

(51) Int. Cl.[7] .............................. G06F 15/16
(52) U.S. Cl. ...................................... 709/206
(58) Field of Search ................. 709/206, 232, 709/238

(56) References Cited

U.S. PATENT DOCUMENTS

| | | | | |
|---|---|---|---|---|
| 5,647,002 A | * | 7/1997 | Brunson ................ | 379/88.18 |
| 5,930,479 A | * | 7/1999 | Hall ..................... | 709/238 |
| 5,937,161 A | * | 8/1999 | Mulligan et al. ......... | 340/7.29 |
| 6,212,550 B1 | * | 4/2001 | Segur .................... | 709/206 |
| 6,216,165 B1 | * | 4/2001 | Woltz et al. ............ | 709/232 |
| 6,279,112 B1 | * | 8/2001 | O'Toole ................. | 713/201 |
| 6,295,552 B1 | * | 9/2001 | Shibata ................. | 379/88.14 |
| 6,301,245 B1 | * | 10/2001 | Luzeski et al. .......... | 370/352 |

FOREIGN PATENT DOCUMENTS

| | | |
|---|---|---|
| WO | WO 93/07566 | 4/1993 |
| WO | WO 97/10558 | 3/1997 |

OTHER PUBLICATIONS

John Kaufeld, "America Online for Dummies 2nd Edition" 1995, IDG Books Worldwide. 2nd Edition, pp. 24, 38, 45, 243, and 248–251.*
Gopal, I. et al., "Directories for ntworks casually connected users", INFOCOM, 1988.*

* cited by examiner

Primary Examiner—Glenton B. Burgess
Assistant Examiner—Kimberly Flynn
(74) Attorney, Agent, or Firm—Frommer Lawrence & Haug LLP; William S. Frommer; Gordon Kessler

(57) ABSTRACT

According to the present invention a communication method and a communication system/network is provided comprising at least one server and a plurality of user terminals. Wherein the user terminals can share information with each other and with the at least one server by means of the internet each user can be accessed by means of a unique address. Thereby a plurality of different unique addresses can be assigned to one user. A corresponding assignment information is stored in a table of the server. The assignment information enables the server to associate a plurality of different addresses for the same user. Respectively one profile can be associated to one of the plurality of addresses assigned to one user, the profiles containing characteristics of the preferences and/or interests of the associated address and being stored in a database of a profile manager. Respectively one home page can be created and associated to one of the plurality of addresses assigned to one user, the home pages being stored on the server. The server furthermore can comprise a group database containing different predefined groups, preferences and/or interests of each group as well as the user addresses which are members of the corresponding group.

14 Claims, 4 Drawing Sheets

| USER | ADDRESSES |
|---|---|
| George X. | ① George.compu.xxx.com<br>② Superman.sport.xxx.com<br>③ Max.game.xxx.com |
| Pete Y. | ① ...<br>② ...<br>③ ... |
| ... | ... |

| group | preferences interests | members |
|---|---|---|
| compu | – computers<br>– networks | – George X.<br>– ...<br>– ... |
| sport | – activities<br>– results | – George X.<br>– ...<br>– ... |
| game | – computer games | – George X.<br>– ...<br>– ... |

MULTIPLE PERSONALITY INTERNET ACCOUNT

BACKGROUND OF THE INVENTION

The present invention generally relates to the field of computer networks. A network is a distributed communication system of computers comprising user terminals and at least one server, the computers of which are interconnected by various electronic communication links and computer software protocols. A particularly well-known network is the internet. The internet is a world-wide network whose electronic resources include among others text files, graphic files in various formats, world-wide-web pages, etc. The scheme for denotation of an electronic resource on the internet is an electronic address which uniquely identifies its location within the network and within the computer in which it resides. On the internet such an electronic address is called URL (universal resource locator).

According to the state of the art, when a user is subscribing with a network service provider, one unique address is assigned to him. Of course, when subscribing a plurality of contracts, one user can have a plurality of different unique addresses. However, when the user has logged in with one of said several addresses, and the other addresses assigned to the same user are not in a logged-in state, no message or notification from a server or another user terminal can be forwarded to the user, when the notification or message is addressed to one of the addresses which are in a non-logged-in state.

SUMMARY OF THE INVENTION

It is therefore the object of the present invention to provide a communication method and a communication system (network) according to which one user can have a plurality of addresses without encountering the above-cited disadvantages. The method and the system according to the present invention provide for a possibility to address a user with a second address assigned to him even in case the user has logged-in with a first address assigned to the same user.

Thereby it is the central idea of the present invention that a plurality of different unique addresses can be assigned to one user, wherein at least one server of a network knows which addresses belong to the same user and can therefore for example send a notification of new mail in another personality to the user though the new mail is dedicated to another address of the user than the address the user has logged-in.

According to the present invention therefore a communication method for a network comprising at least one server and a plurality of user terminals is provided, wherein the user terminals can share information which each other and with the at least one server by means of the network and each user can be accessed by means of an unique address. A plurality of different unique addresses can be assigned to one user. A corresponding assignment information for each user is stored in a table of the server. The assignment information enables the server to associate a plurality of different addresses with the same user.

Messages can be sent from the server or a first user terminal to a second user terminal. When the user of the second user terminal has logged in with a first of the plurality of addresses assigned to him, the server checks the table containing the assignment information and a message is also sent to the user of the second user terminal, when the message is sent to another address assigned to the same user than the address the user has logged in with.

Respectively one profile is associated to one of the plurality of addresses assigned to one user. The profiles can contain characteristics or preferences and/or interests of the associated address and can be stored in a data base of a profile manager.

The data base of the profile manager can be stored on the server.

Preferably the data base of the profile manager is stored in an object-oriented approach on the server.

Respectively one home page is created and associated with one of the plurality of addresses assigned to one user, the home page being stored on the server.

The different addresses assigned to one user respectively can belong to another one of a plurality of user groups predefined by and stored in the server.

On the server a group data base can be provided containing different predefined groups, preferences and/or interests of each group as well as the user addresses which are a member of the corresponding group.

According to the present invention furthermore a communication network is provided comprising at least one server and a plurality of user terminals. The user terminals thereby can share information with each other and with the at least one server by means of a network and each user can be accessed by an address. According to the present invention a plurality of different unique addresses can be assigned to one user. The server comprises a table storing an assignment information. The assignment information enables the server to associate a plurality of different addresses with the same user.

BRIEF DESCRIPTION OF THE DRAWINGS

Further characteristics and advantages of the present invention will be explained with reference to embodiments of the present invention and the enclosed drawings.

FIG. 3 shows a table installed in the server and containing assignment information of different addresses of one user, FIG. 4 shows an example of the information stored in a group data base.

DETAILED DESCRIPTION OF THE PREFERRED EMBODIMENTS

Figure 1:
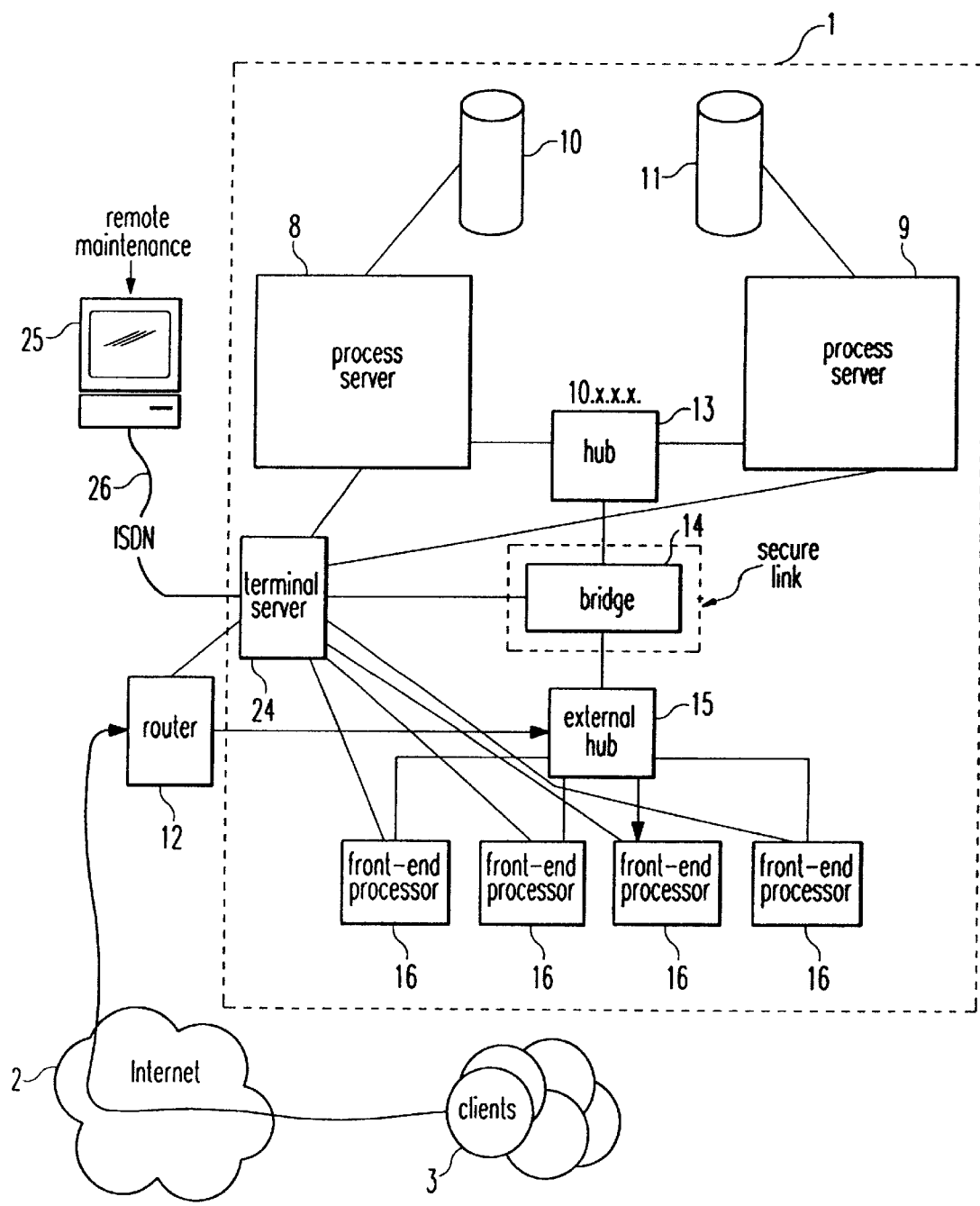
FIG. 1 shows an overview over a hardware structure which can be used for the application of the present invention.

The present invention relates to the technical field of networks particularly for an Internet application. Such a network generally should offer the following services:

messaging between individuals, or for notification of events or special offers, with the control center prompting for user response;
  web-based e-mail;
  one-to-one and many-to-many chat groups;
  discussion groups (Internet news groups)
  public event scheduling;
  online searching for people, events, and information, with results filtered based on member focus and preferences;
  a free home page simple tools to create and modify web pages;

contact list management and facilities to make it easy to recruit friends and family, an address book and personal data base, common across a plurality of devices and services;

the opportunity to use a plurality of identities per person, along with associated preferences and interests for each identity;

community center;

simple tools to enable individual members to set up and manage chat rooms and discussion groups with friends or other like-minded people;

and innovative navigation

Further services can comprise narrowly targeted advertising, electronic commerce, and cross-platform support for intelligent devices such as telephones, televisions, or personal digital assistants.

Members of the network can have profiles of information about them, not just names and addresses, but also their interests and preferences. Members will be able to enter and edit preferences if they wish, but they need not to fill out a form to derive this benefit. Member profiles can be built up over time as a process in the system watches what they access, sign up for, or otherwise evince interest in.

User profiles can be used to filter searches, so that the results of a keyword search can be ranked according to preferences suggested by the user profile.

According to the present invention, members are able to assume several identities: for example, a personal, professional, and one identity used for fantasy or play. Members can have a home page and a profile for each identity, and can maintain anonymity in any interaction, if they so choose. Therefore a plurality of home pages respectively for one identity of a user can be assigned to one user. This will be explained in detail further below.

Users can create their home pages by answering a series of questions, and various templates can be available to make it easy for members to create their home pages and other places quickly, without learning HTML. ("Places" are more than simply static text and graphics in an HTML page. They can use data from various databases, accessed by client or server application.). Generally, according to the present invention an object-oriented approach is preferred for example by using the programming language Java in combination with object-oriented data bases.

Users can control how much screen real estate to devote to the service provided by the present invention at any given moment. Depending on their degree of engagement with the system, the service can appear to members as an icon, a gadget, or a browser. If members are logged on but primarily interested in doing other work, the service will retire to a corner of the desktop as a modest icon indicating that they are logged in. In this mode, members may still receive notifications, if they choose. An intermediate degree of engagement presents the service as a "gadget" —a control center occupying minimal space on the desktop and allowing users to focus elsewhere while still maintaining immediate access to most functions. When users wish to immerse themselves in the system, the can open their favorite browser and other communication tools and integrate them with the service.

True to the central tenet of user control, the service offers members the ability to log onto the system and put out the equivalent of a "Do not disturb" sign., if they wish to accomplish something without being interrupted by messages. The "Do not disturb sign" can be limited on a group of identities of the user. Therefore the user can choose which messages he wants to receive even when they are addressed to another identity of the user than the log-in identity.

Users also have a database of personal information— contact information for friends and associates, lists of upcoming events they are interested in, pending e-mails, news, or any other information they want to keep. Processes in the system automatically create and maintain this database on the server, as a result of specific user action. Because it is kept on the server and not on the user's host computer, this database will be accessible from any compatible device.

The network according to the present invention is a large, complex, web-based system consisting of multiple databases and many collaborating, communicating processes. The databases hold a rich variety of heterogeneous data. For these reasons, an object-oriented approach is used: it allows rapid prototyping and produces code that is modular and relatively easy to enhance and extend. Also, object-oriented databases are particularly suited to holding heterogeneous data.

The system according to the present invention uses the Java programming language. Java is optimized for web-based development, being portable on both the server side (the computers executing system processes and running the databases) and the client side (the machine running the user's browser). It is also an object-oriented language and allows for rapid development, since (among other features) it does not require explicit memory management.

A user connecting to the system starts a client process that coordinates communications with the service and other users. The client process connects to a server using HTTP and communicates with a software entity called Session Manager by means of a persistent process, the Connection Manager.

The Session Manager allows a user to log into the system once, and then maintain his or her identity while performing any number of operations lasting an arbitrary amount of time. The Session Manager connects to a data base of members (including community organizers) and is responsible for knowing who is logged onto the system at any time, and whether they have posted the equivalent of a "Do not disturb" sign. It collaborates with another software entity, the Notification Server, which is responsible for transmitting the actionable messages (notifications) that users can send to each other. This collaboration allows the Notification Server to know who is online at any given time, and who is online but does not wish to be disturbed.

A Profile Manager maintains a database of user profiles— personal preferences and interests. As the member uses the system, various session-tracking processes watch in the background to capture relevant data (with the user's knowledge and consent). The data is then provided to the Profile Manager.

User profiles are stored in a manner ensuring security and anonymity. In accordance with the Open Profile Standard, the Profile Manager also ensures that profile information is sent only to those authorized to receive it, and that it is encrypted to ensure privacy.

An FYI Server is the process that periodically performs searches for information that the user has requested, based on explicitly provided search parameters and information in the user's profile. Its output is stored in the user's personal database.

A Directory Server enables searching. It maintains a database of all information on the system, in any form— Web pages, user profiles, chat sessions, or any form of events sponsored by community organizers—any kind of data at all. The Directory Server collaborates with the Profile Manager to filter the results of searches and rank them in accordance with the searcher's interests and preferences. The Directory Server also allows members to connect to general World Wide Web search engines; it may also filter the results of those searches.

A Name Server is an essential part of the transmission infrastructure, keeping track of all the servers on the system in their various locations.

A typical hardware installation which can find application with the present invention is shown in FIG. 1. Each hardware installation represents a network domain.

Reference 1 generally designates a server 1 connected to user terminals (clients) 3 by means of a network (Internet) 2.

Each installation includes at least two process servers 8, 9 each connected to a database 10,11. The process servers 8, 9 are the computers that execute the many interacting software processes. A minimum of two are required for redundancy; if one server 8,9 experiences a problem, the system can continue running and users experience no interruption in service. When a growing number of users 3 place increasing demands on the system, more servers can be added as necessary to increase system capacity.

The databases 10, 11 associated with the process servers 8, 9 hold the persistent data in the system: information about members, events, discussion groups, home and community web sites, and much else. They may reside on the same physical hard drive or different ones. They are object-oriented databases 10, 11.

Security

The databases 10, 11 can contain sensitive private information about members. Security will be implemented by isolating the process servers 8, 9 on a network having an IP address of the form 10.x.x.x. Routers 12 cannot connect directly to such a network. Instead, the network 2 is connected to a hub 15 connected to a bridge 14 which in turn connects to another hub 15. This second hub 15 is on a network 2 to which routers 12 can connect.

The security bridge 14 protects the back-end process servers 8, 9 and databases 10, 11. A firewall could be placed between the hub 13 and the switch 14 to provide additional security for the back-end process servers 8,9 and data bases 10, 11 as well.

Clients and Front-end Processors

A user connects to the system using the control center (17 in FIG. 2)—the user's client process 3. The client process 3 connects from the Internet 2, through the router 12, to the external hub 15 and from there to a front-end processor 16: a computer 16 outside the security wall. The front-end processor 16 handles communication between the back-end server 8, 9 and the client 3 during authentication; a necessary step before the client process 3 can access.

The front-end processors 16 run so called daemons—background processes—for HTTP (Web access), NNTP 19 (news and discussion groups), IRC 20 (chat), and e-mail 21. They also run DNS (Domain Name Service) 22. Each front-end processor 16 may run all the required daemons. Alternatively the required daemons may be spread across several front-end processors 16.

After a user is authenticated following well known procedures, the front-end processors 16 connect the Connection Manager process to the Session Manager 23 through the bridge 14 to a process server 8, 9 and a database 10, 11.

The central installation also includes a terminal server 24 directly connected to every piece of hardware: computers, bridge 14 and router 12. An ISDN line connects this terminal server 24 to a remote location 25 where the operations manager can run tests, upgrade software, install patches, or reboot systems as necessary. The operation manager's dialup access is also secure; simply knowing the correct telephone number is not enough to gain access to the system through the maintenance channel 26.

Figure 2:
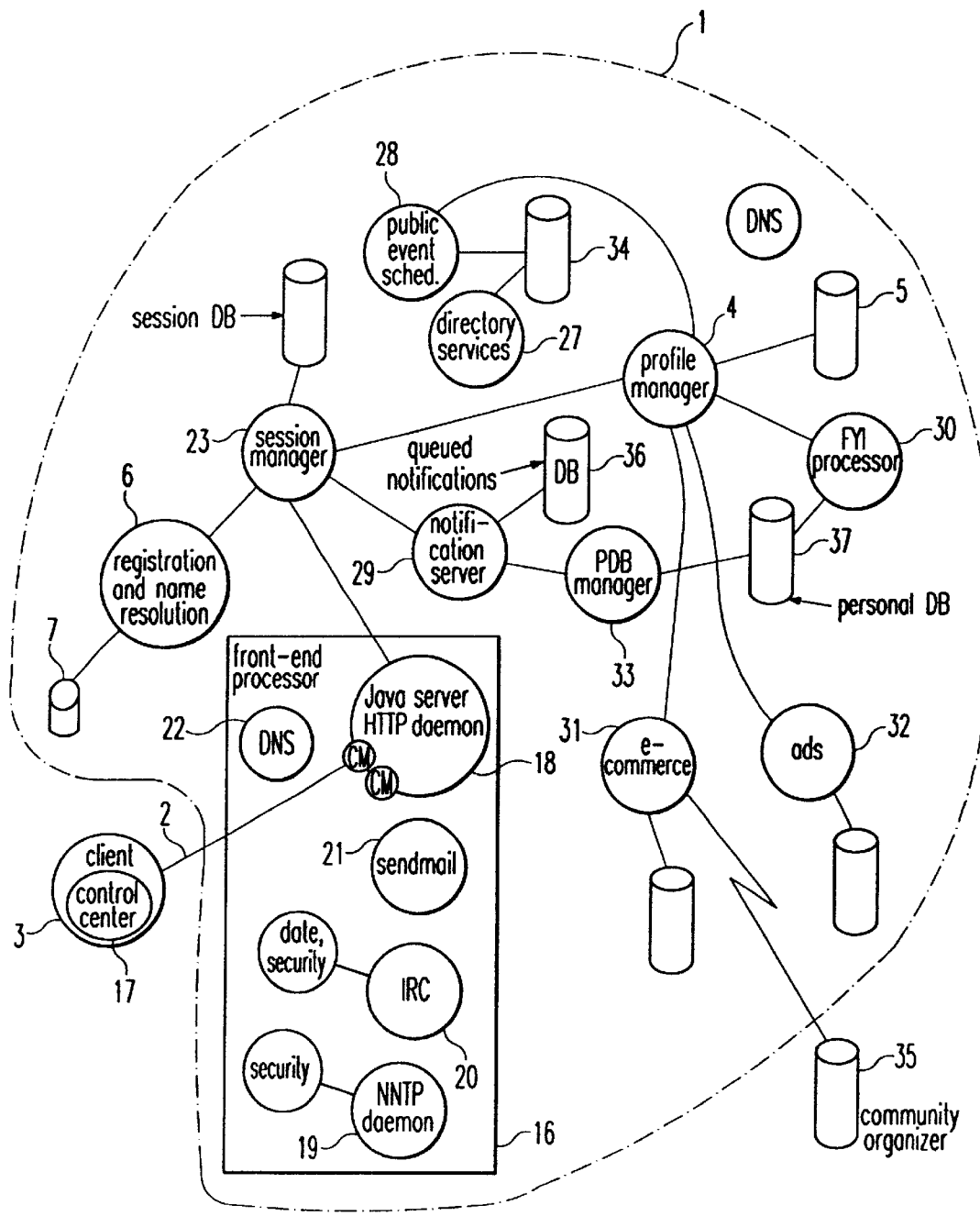
FIG. 2 shows in detail the activity distribution in the server and the user terminal of the network hardware structure shown in FIG. 1.

The processes of the hardware structure shown in FIG. 1 will now be explained with reference to FIG. 2.

The software constituting the processes can be written in Java using an object-oriented design. Most of the software runs on the process servers 8, 9, but also some software is written for the front-end processor 16.

Front-end Processors

When a client process 3 (the user's control center 17) connects to a front-end processor 16, that processor's HTTP daemon 18 spawns a new thread to manage the connection as it is known in object-oriented programming. These connection managers are terminated when the user severs the connection.

The IRC and NNTP daemons 19, 20 also include specialized processes to augment their capabilities. To allow for private chats and discussion groups, both daemons include security software that allows for access control. The IRC daemon 20 also transparently translates user names required by IRC (which have a nine-character limit).

Process Servers

The bulk of the processes runs on the back-end process servers 8, 9. In addition to DNS, the processes summarized in Table 1 collaborate to provide NCP's functionality. Each is discussed in greater detail below.

TABLE 1

NCP Processes

| Process | Purpose | Associated database? |
|---|---|---|
| Session Manager 23 | Tracks who is logged in (user and personality), and their current state: available, away, busy, or invisible. | Yes |
| Name Resolution 6 | Correctly identifies user based on multiple identity, e.g. helps route user notifications to the correct process server. | Yes |
| Directory Services 27 | Used primarily for searching through the system. May also be used to schedule public events. | Yes |
| Public Event Scheduler 28 | May be integrated with Directory Services instead of separate process (unresolved issue). Schedules public events such as simulcast, celebrity chat. | Uses Directory Services Database. |
| Profile Manager 4 | Updates user's profile in response to specific user actions. Later releases may augment this with session-tracking. | Yes. Must be secure. |
| Notification Server 29 | Sends messages (notifications) to members. | Yes, for queued notifications only. |
| FYI Processor 30 | Searches periodically for new info of interest, based on user's profile. | Uses Profile Manager database. |
| Personal Database Manager 33 | Manages a home page info, FYI info, queued notifications, pointer to user profile, application preferences, and "people I know" list. | Yes |
| E-commerce 31 | Supports online commercial transactions. | Yes. May also connect to CO's own database |
| Advertising 32 | Supports targeted advertising | Yes |

Session Management

The Session Manager 23 collaborates with the connection manager in the front-end processor 16 to enable users to log in and out. In addition, it returns a handle to a user's connection manager whenever a message arrives for that user: a notification, an e-mail message, or any other type of requested connection.

The Session Manager 23 also maintains session state: principally, the user's current "personality" and status. When logged in, users can be available, away, invisible or busy:

An available user can receive notifications from anyone.

Being invisible is a way to accomplish tasks without being bothered by others. While invisible, users can perform any system action they wish, but will not be visible to others' searches, nor will they receive other user's notification. (They may, however, receive notifications from community organizers.)

While away, users are visible to others. Being away is a means of letting others know that the user has stepped away from the computer for a brief period, perhaps for a cup of tea. If another user requests a chat or other real-time operation, the requester is informed that the requested user is away for a short period, and to try again later.

Being busy tells the others that the user is on the system but otherwise occupied, and doesn't wish to be disturbed. While busy, users are visible to others' searches but will not receive other users' notifications. (They may, however, receive notifications from community organizers.) Those wishing to contact can send e-mail or wait until the user becomes available.

Name resolution

This process 6 runs only in the central server. It receives all requests to locate destinations (typically generated form notifications and e-mail), and is responsible for telling the requesting service which physical system the user is logged into, thus allowing the message to be routed to the correct server. It is the sole process with access to this information, thus helping to ensure user anonymity—users will not even be able to look at mail headers and tell which city someone lives in (or near).

Directory services and event scheduling

This process 27, 28 can access a database 34 including all the searchable items, such as members, clubs, events, chat rooms, public or semi-private discussion groups, and home pages and other web sites. Searching is text-based, at least initially, using word-matching. Directory services 27 collaborate with the Profile Manager 4 to rank the results for relevance, based on the user's stated interests.

In addition, users can search for items belonging only to a particular category: for example, only discussion groups or only home pages or only people.

Event scheduling allows community organizers 35 to schedule events such as simulcasts, chats with public figures, or video conferences or other multimedia events at the most auspicious time. They can query the schedule to determine when possibly competing events are scheduled, and choose a time likely to be favorable.

Profile manager

Each user 3 has at least one profile, which stores not only such commonplace information as name, address, nationality and preferred language, but also a variety of more sensitive information such as age, sex, marital status, income, occupation, education, religious preference, social class, lifestyle, and other demographic and psychographic data useful for marketing purposes.

It is imperative that adequate safeguards ensure that:

personal information is kept strictly confidential, and data gathered for marketing purposes is kept strictly ananymous.

This is the primary reason for the physical and hardware security described above. No aspect of the software must be allowed to compromise this security.

Profiles can be used for a variety of purposes:

special event planning,

FYI data gathering, targeted advertising targeted promotions and loyalty programs When planning special events, community organizers 35 can find out how many members might be interested in the event, and can send e-mail and notifications only to those whose profiles indicate such potential interest. Although the community organizers 35 will have no knowledge of which specific individuals received their mail or notices, they will be assured that a certain number were sent, and that those who received them are more likely than most to have appreciated them.

The FYI process 30 uses member profiles to determine which data to gather on each member's behalf.

Notification server

The notification server 29 is responsible for sending notifications between individuals, and between community organizers and individuals. To do so, the notification server 29 collaborates with the session manager 23 to determine who is currently online and available, and to get a handle to the recipient's connection manager in order to deliver the message. It then communicates with the notification server 29 on the recipient's server machine, if different, to deliver the notification.

Notifications are of two kinds: real-time and queued. Real-time notifications are typically from one individual member to another. When received, they are stored on the client's machine 3. If the intended recipient is off-line or invisible, they are not delivered.

Queued notifications are sent by community organizers 35, typically to many members whom the community organizer believes will be interested. When they are created, the community organizer specifies a "time to live"—a period of time during which the notification remains relevant. If the intended recipient is off-line, they are queued in the notification server's 33 associated database 36 and delivered as soon as the recipient logs in, assuming that this occurs before the notification expires.

According to the present invention a plurality of addresses can be assigned to one user, as it is shown in FIG. 3. For example, possible addresses for the user George X. can be George@compu.xxx.com Superman@sport.xxx.com Max@game.xxx.com As can be seen from the above addresses, the user George X. can have different identities (George, Superman, Max) being respectively member of different groups (compu, sport, game, etc.). Each identity is easy to remember, and as there are different groups of users and one identity is only unique regarding one group, the numbers of interesting identities available for the users can be increased overall.

"xxx" represents the part of the URL designating the server or company name. Compu, sport and game represent both the group and the server (physical or virtual). The assignment information indicating which addresses are assigned to the same user is stored in a table 6 of the name resolution and registration process of the server 1. Thereby, preferably and object-oriented approach is used. Therefore the server 1 by checking the table 6 knows always which addresses belong to the same user.

It is assumed, that the user George X. has logged in by using the address "George@compu.xxx.com". In case the server 1 or another user 3 wants to forward an E-mail message to the user George X. who has logged in with the address "George@compu.xxx.com", and addresses this E-mail message to the address e.g. "Superman@sport.xxx.com", such a transmission will be prohibited according to the prior art. It will be prohibited, as the address "Superman@sport.xxx.com" at the moment is not available in the network, as George X. has not logged with said address.

According to the present invention, however, even in the case that George X. has logged in using the address "George@compu.xxx.com" an E-mail message sent for example to the address "Superman@sport.xxx.com" will cause a notification to be sent to George X., as the server 1 will check the table 6 and determine, that the address "Superman@sport.xxx.com" does belong to the user George X., who is in a logged-in state, but with another address ("George@compu.xxx.com").

The notification could read "Superman@sport.xxx.com has mail". The user George X. can then decide whether he wants to connect as "Superman@sport.xxx.com" to access the new mail.

The user can associate the "Do no disturb sign" for a limited number of his identities. For example, when logged-in with the address "George@compu.xxx.com"), the user can select to not receive any message or notification addressed to his other address "Superman@sport.xxx.com". Therefore he will not be disturbed by other users seeking for sport orientated users when working professionally on his terminal.

Of course, the user can also choose that he is completely invisible for predefined identities among all identities assigned to him.

According to the present invention, respectively one profile containing characteristics of the preferences and/or interests of an associated address can be associated to one of the plurality of addresses assigned to the same user. The profiles can be stored in a database 5 of the profile manager 4. For example, in the case of FIG. 3, the user George X. will have a user profile associated with each of the plurality of addresses shown in FIG. 3. As each of the addresses represents a different identity of the user George X., the associated profiles will indicate different behaviors of George X. depending on the address used to log in by George X.

Other users will never know, which addresses are assigned actually to the same user person. Full secrecy is guaranteed as only the server knows the correlation of the different unique addresses with the users.

Furthermore, according to the present invention respectively one home page can be created and associated to each of the plurality of addresses assigned to the same user. In the case of FIG. 3, for example, the user George X. can have a home page for the address "George@compu.xxx.com", another home page for the address "Superman@sport.xxx.com and one further home page for the address "Max@game.xxx.com".

As each of the addresses represent a certain different behavior of the user George.X., the different home pages will be created in a different way. The different home pages can also be stored in the server 1.

As has been shown with reference to FIG. 3, each address comprises a group name (compu, sport, game). These group names can be predefined and offered by the server 1. In the server 1 a group data base 7 is provided setting forth the different predefined groups offered to the users, the related preferences/interests and the users being members of the corresponding groups. Alternatively, users can create their own groups, define their related preferences/interests and access to the server 1 to add the new created group to the data base 7 in the server 1.

Figure 5:
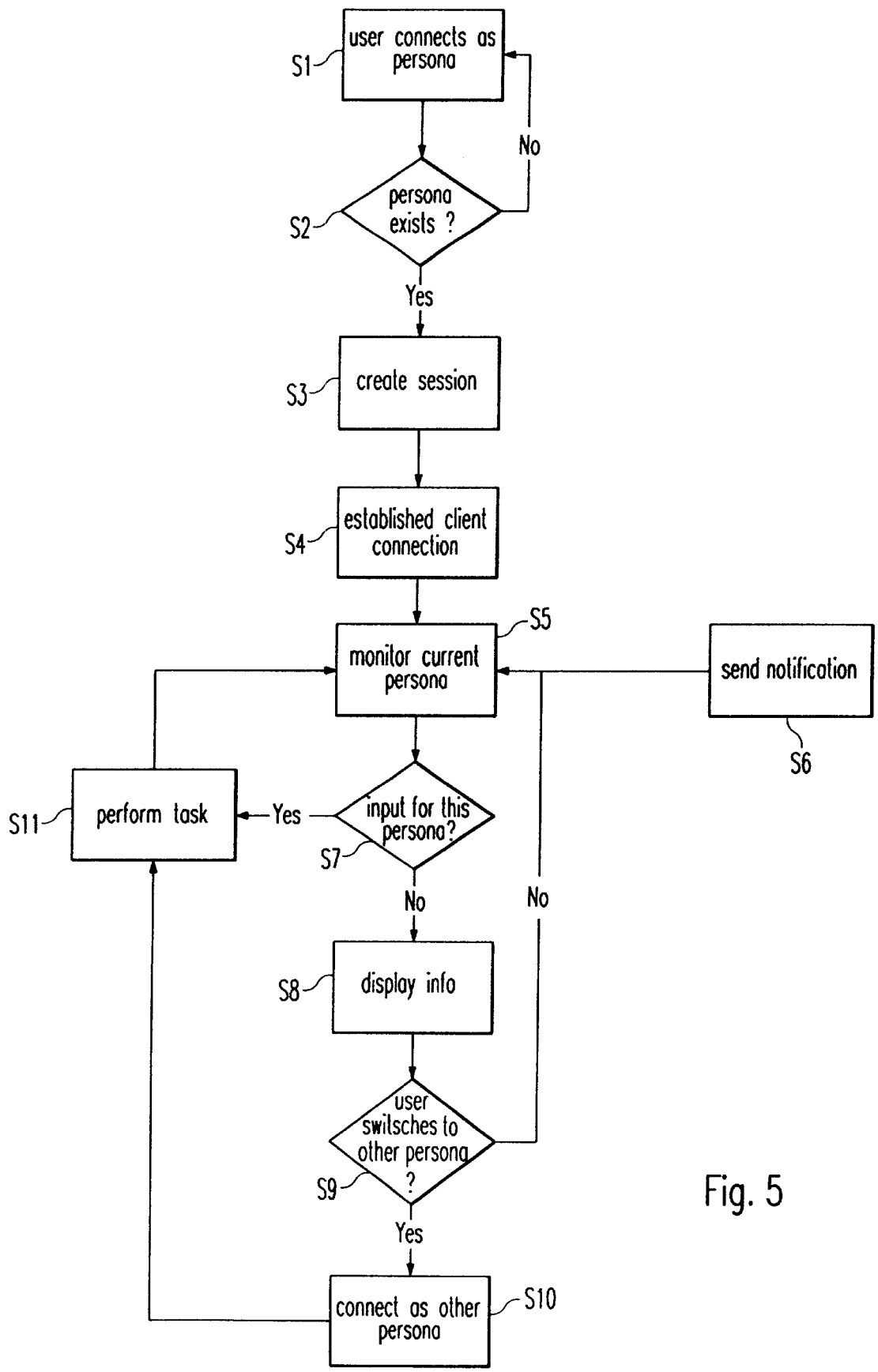
FIG. 5 shows a procedure executed according to an embodiment of the present invention.

With reference to FIG. 5 it will now be explained how a user can use his different identities (personas).

The user is connecting as one of his plurality of personas (step S1). It will then be checked whether this persona actually exists (step S2). In case the persona exists, the session manager 23 creates a session (step S3). The client connection is established (step S4). The current persona is always monitored (step S5). This is particularly important when a notification is sent to a persona (step S6). It is checked whether an input exists for the current persona (step S7). In case an input is detected for the current persona in step S7, the corresponding task is performed (step S11) and the procedure goes back to step S5. In case no input for a persona is detected in step S7, an info is displayed in step S8. Then it is checked whether the user switches to another one of his plurality of identities (personas) in step S9. In case no switching of identity is detected in step S9, the procedure goes back to step S5. In case an identity change is detected in step S9, the user connects as another persona (step S10). Then the task is performed in step S11 using the other persona of the user.

What is claimed is:

1. A method for a plurality of user terminals and a server to communicate in a network, comprising the steps of:

assigning a plurality of different unique addresses to a user, storing a corresponding assignment information for the user in a table of a server;

associating the plurality of different addresses with the user by the assignment information by the server, transmitting a message from the server or a first user terminal to a second user terminal;

checking the table containing the assignment information by the server when the user of the second user terminal has logged in with a first address of the plurality of addresses assigned to the user, and transmitting the message to the user of the second user terminal, wherein the message is transmitted to a second address assigned to the user different from the first address the user has logged in with.

2. Communication method according to claim 1, characterized in that respectively one profile is associated to one of the plurality of addresses assigned to one user, the profiles containing characteristics of the preferences and/or interests of the associated address and being stored in data base of a profile manager.

3. Communication method according to claim 2, characterized in that the data base of the profile manager is stored in an object-oriented approach on the server.

4. Communication method according to claim 2, characterized in that the data base of the profile manager is stored on the server.

5. Communication method according to claim 1, characterized in that respectively one home page is created and associated to one of the plurality of addresses assigned to one user, the home pages being stored on the server.

6. Communication method according to claim 1, characterized in that the different addresses assigned to a user respectively belong to another one of a plurality of user groups predefined by and stored in the server.

7. Communication method according to claim 6, characterized in that the server comprises a group data base containing different predefined groups, preferences and/or interests of each group and the user addresses which are members of the corresponding group.

8. A communication network, comprising:

a server, and a plurality of user terminals, wherein a plurality of different unique addresses are assigned to a user, the server comprises a table storing a corresponding assignment information for the user, the assignment information enabling the server to associate the plurality of different unique addresses with the user, the server or a first user terminal is adapted to transmit a message to a second user terminal, the server checks the table containing the assignment information when the user of the second user terminal has logged in with a first address of the plurality of addresses assigned to the user, and the message is transmitted to the user of the second user terminal when the message is transmitted to a second address assigned to the user different from the first address the user has logged in with.

9. Communication network according to claim 8, characterized in that a profile manager with a data base connected therewith is provided, wherein in the data base respectively one profile is associated to one of the plurality of addresses associated with one user, the profiles containing characteristics of the preferences and/or interests of the associated address.

10. Communication network according to claim 9, characterized in that the data base of the profile manager is provided on the server.

11. Communication network according to claim 9, characterized in that the data base of the profile manager is stored in an object-oriented approach on the server.

12. Communication network according to claim 8, characterized in that respectively one home page is created and associated to one of the plurality of addresses assigned to one user, the home pages being stored on the server.

13. Communication network according to claim 8, characterized in that the different addresses associated with a user respectively belong to another one of a plurality of user groups predefined by and stored in the server.

14. Communication network according to claim 13, characterized in that the server comprises a group data base containing different predefined groups, preferences and/or interests of each group and the user addresses which are members of the corresponding group.

\* \* \* \* \*